UNITED STATES PATENT OFFICE.

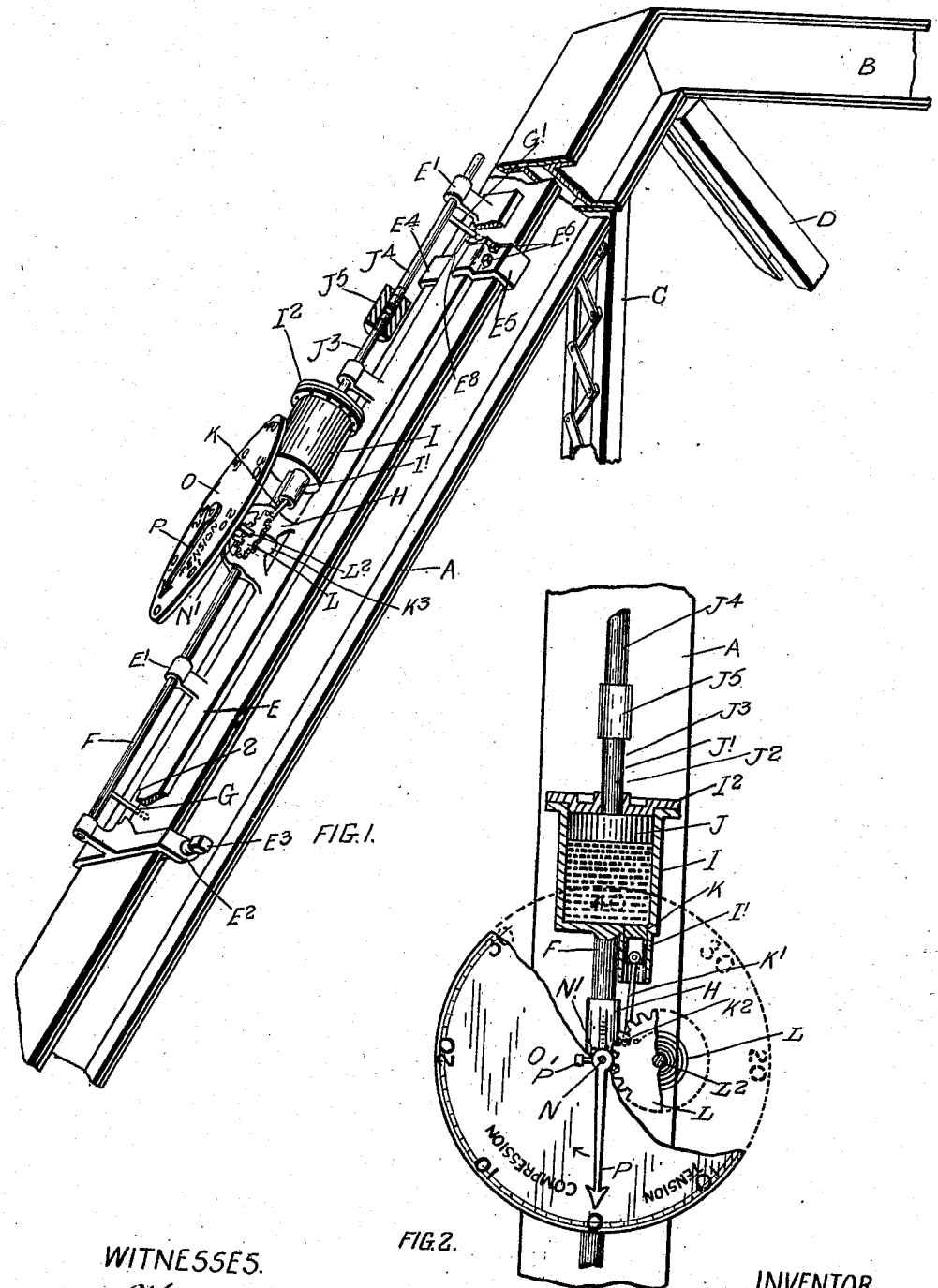

WALTER PECK CHAPMAN, OF TORONTO, ONTARIO, CANADA.

STRESS-INDICATOR.

No. 924,427.  Specification of Letters Patent.  Patented June 8, 1909.

Application filed February 25, 1908. Serial No. 417,721.

*To all whom it may concern:*

Be it known that I, WALTER PECK CHAPMAN, of the city of Toronto, in the county of York, in the Province of Ontario, Canada, have invented certain new and useful Improvements in Stress-Indicators, of which the following is the specification.

My invention relates to improvements in stress indicators, and the object of the invention is to devise an indicator of this class applicable to both compressive or tensile stresses, and particularly adaptable for testing the strength of steel construction, bridges and buildings, whereby the amount of tension or compression in pounds to the square inch under any load, stationary or movable, may be ascertained quickly and closely, so as to obviate to the greatest extent possible the structure in any of its parts or members exceeding the limit of safety.

My invention consists of an instrument comprising a suitable base, a stationary rod at one end held in suitable supports on the base and a longitudinal adjustable rod held in suitable supports on the base at the opposite end provided with a pin extending into a hole in the plate of the end post and connected to a hydraulic cylinder, a supplemental cylinder extending from one end of the main cylinder, a minor piston located therein, a gear wheel mounted on a suitable arbor and having a spring attached thereto to counter-balance the pressure on the minor piston, an arbor mounted in suitable bearings and provided with a pinion meshing with the gear wheel, a dial suitably supported and indexed at the outer edge, and a hand adjustably supported on the end of the arbor, the parts being otherwise constructed and arranged as hereinafter more particularly explained.

Figure 1, is a perspective view showing portion of a bridge and the application of my instrument thereto to measure the compression stresses. Fig. 2, is a plan view partially broken away and in section showing my instrument.

In the drawings like characters of reference indicate corresponding parts in each figure.

A is the end post of a bridge or other truss.

B is the top cord, C the vertical member and D the diagonal member.

I show my instrument applied to the end post and to the top plate thereof.

E is the base of the instrument having the supports E' extending out at right angles thereto and projecting bent lugs $E^2$ at one end by which it is held on the post by set screws $E^3$ extending through the same. The opposite end of the base E is provided with an end projection $E^4$ held in place by a suitable set screw.

$E^5$ is a clip, which fits over the edge of the plate and the base E, such clip being held in position by suitable screws $E^6$, so that it may be readily removable.

F is a stationary rod, which is held in the supports E' and G is a pin projecting inwardly from the rod F into a hole in the plate A, such hole being, of course, drilled previously to the instrument being set in place. The pin G extends through a slot 2 in the base E.

H is a support intermediate of the length of the base E and through which the rod F extends. On the end of the rod F I provide a cylinder I, which cylinder has formed or attached to the same a supplemental cylinder I' as indicated. The cylinder is partially filled with oil or other suitable fluid and is provided with a piston J having the piston rod J', which extends through the head $I^2$ of the cylinder as indicated. On the rod J' is an index mark $J^2$ for a purpose which will hereinafter appear. The rod J' is made in two parts $J^3$ and $J^4$, which are connected by a coupling $J^5$ provided with a right and left hand internal thread to fit into the corresponding threads of the portions $J^3$ and $J^4$. The rod J' is also held in supports E', and is provided with a pin G', which extends through a slot $E^8$ in the base plate E into a hole in the top plate of the end post.

K is a piston fitting in the minor piston I' and connected by a rod K' to a crank pin $K^2$ on the gear wheel L, which is held on a suitable arbor $L^2$ journaled in suitable bearings $K^3$.

L' is a helical spring attached at one end to the gear wheel L and at the other end to the arbor, the normal tendency of such spring being to force the gear wheel in a direction contrary to what the liquid in the piston I will force the piston K, or in other words to compensate the pressure of the liquid on the piston.

N is an arbor journaled in the support H and having a pinion N' secured thereto, which meshes with the gear wheel L.

O is a dial plate in which the arbor N is centrally disposed, such dial plate being suitably held in position on the top of the support H.

P is a hand secured on the top of the arbor by means of a set screw P', whereby the position of the hand may be altered as hereinafter explained.

Each half of the dial plate is divided from zero to forty, thus indicating thousands of pounds to the square inch. It will be noticed that the index numbers ten, twenty, and thirty when the dial is in the normal position are located on each side of the center line of the rods F and J', and that the cipher 0 and number 40 are arranged diametrically opposite each other on a line with the rods F and J'.

Having now described the principal parts involved in my invention I shall briefly describe its operation and utility. The instrument is placed in position as indicated in the drawing on the end post of the structure. As soon as the load is transmitted to the end post the indicator will show the stress upon the same and the percentage of the recovery of such member from such loading after the load is removed. The present instrument is placed on the end post of a bridge and serves to indicate the compressive stress. The hand being caused to move around from zero as the piston J is forced inwardly, the motion is communicated to the hand through the supplemental piston K and gear wheel L and the pinion N'. If the instrument is placed on a lower member of a bridge or structure in which it is desired to ascertain the tensile strength of the member the pinion J would be moved down in the cylinder I to a point indicated by $J^2$. This would necessarily throw the hand around by means of the gear wheels aforesaid to a point diametrically opposite the present position shown in the drawing, and in order to measure the tensile stress it would be necessary, of course, to release the set screw P' and move the hand back to zero. The outward moving of the piston then would pull upon the piston K and the spring $L^2$ would force the hand around in the opposite direction to that hereinbefore described and indicated by arrow.

Among the advantages of my invention I may state, that the instrument may be affixed to the lower member of a bridge, building or other structure and the loading or stresses will be shown as the work progresses. If affixed to a member of a bridge already erected the stress due to a train, engine or other loading, stationary or otherwise on a bridge can be registered.

In practice I prefer to use my instrument, so that the pins extend into the structure at a distance of ten feet apart. The holes into which the pins are inserted would, therefore, be arranged ten feet apart and if the pins are not exactly opposite the holes the pin on the movable rod J' may be adjusted into position by means of the nut $J^5$.

What I claim as my invention is:

1. A stress indicator comprising a suitable base and supports and a stationary rod held in the support at one end and an adjustable rod held in the support at the opposite end, a pin extending from the stationary rod into a hole in the structural member, a pin extending from the adjustable rod into a hole in the structural member, a piston on the end of the adjustable rod, a cylinder suitably supported on the end of the stationary rod, a supplemental cylinder extending from one end of the main fluid containing cylinder, a piston located therein, a piston rod connected to the piston, a dial plate suitably supported and provided with a central arbor, a hand on the arbor and means operated from the minor piston rod for turning the arbor as and for the purpose specified.

2. A stress indicator comprising a suitable base and supports and a stationary rod held in a support at one end and an adjustable rod held in a support at the opposite end, a pin extending from the stationary rod into a hole in the structural member, a pin extending from the adjustable rod into a hole in the structural member, a piston on the end of the adjustable rod, a cylinder suitably supported on the end of the stationary rod, a supplemental cylinder extending from one end of the main fluid containing cylinder, a piston located therein, a piston rod connected to the piston, a dial plate suitably supported and provided with a central arbor, a hand on the arbor, a gear wheel connected to the opposite end of the minor piston rod, an arbor on which the same is held suitably journaled and a pinion on the main arbor extending through the dial plate as and for the purpose specified.

3. A stress indicator comprising a suitable base and supports and a stationary rod held in a support at one end and an adjustable rod held in the support at the opposite end, a pin extending from the stationary rod into a hole in the structural member, a pin extending from the adjustable rod into a hole in the structural member, a piston on the end of the adjustable rod, a cylinder suitably supported on the end of the stationary rod, a supplemental cylinder extending from one end of the main fluid containing cylinder, a piston located therein, a piston rod connected to the piston, a dial plate suitably supported and provided with a central arbor, a hand on the arbor, a gear wheel connected to the opposite end of the minor piston rod, an arbor on which the same is held suitably journaled, a pinion on the main arbor extending through the dial plate and a helical spring surrounding the arbor of the gear wheel and connected at one end to the arbor and at the opposite end to the gear wheel as and for the purpose specified.

WALTER PECK CHAPMAN.

Witnesses:
B. BOYD,
R. COBAIN.